United States Patent [19]

Hijikata et al.

[11] Patent Number: 4,620,872
[45] Date of Patent: Nov. 4, 1986

[54] COMPOSITE TARGET MATERIAL AND PROCESS FOR PRODUCING THE SAME

[75] Inventors: Kenichi Hijikata, Urawa; Katsuyuki Sato, Ohmiya; Hitoshi Maruyama, Kuki; Ryoko Furuhashi, Kumagaya, all of Japan

[73] Assignee: Mitsubishi Kinzoku Kabushiki Kaisha, Tokyo, Japan

[21] Appl. No.: 787,529

[22] Filed: Oct. 15, 1985

[30] Foreign Application Priority Data

Oct. 18, 1984 [JP] Japan ................... 59-219227
Nov. 16, 1984 [JP] Japan ................... 59-241831

[51] Int. Cl.$^4$ .................. C22C 19/07; C22C 38/00; B22F 3/00
[52] U.S. Cl. ..................... 75/246; 419/45; 419/50; 420/435; 420/83; 148/425; 148/301
[58] Field of Search ............. 75/123 E, 246; 420/435; 148/31.57, 39, 105, 400, 408, 425; 419/45, 46, 49, 50; 252/62.55

[56] References Cited

U.S. PATENT DOCUMENTS

| | | | |
|---|---|---|---|
| 3,821,035 | 6/1974 | Martin | 148/103 |
| 4,211,585 | 7/1980 | Inomata et al. | 148/103 |
| 4,221,613 | 9/1980 | Imaizumi et al. | 420/435 |
| 4,541,877 | 9/1985 | Stadelmaier | 419/45 |
| 4,563,330 | 1/1986 | Narasimhan et al. | 420/435 |

FOREIGN PATENT DOCUMENTS

| | | | |
|---|---|---|---|
| 69233 | 5/1980 | Japan | 75/123 E |
| 156734 | 12/1981 | Japan | 75/246 |
| 6350 | 1/1984 | Japan | 75/246 |
| 106106 | 6/1984 | Japan | 75/246 |

Primary Examiner—Stephen J. Lechert, Jr.
Assistant Examiner—Anne Brookes
Attorney, Agent, or Firm—Frishauf, Holtz, Goodman & Woodward

[57] ABSTRACT

A novel composite target material that is composed of a rare earth metal and a transition metal (iron-group metal) and which is used in the formation of a thin magnetooptical recording film by sputtering is disclosed. Also disclosed is a process for producing such composite target material.

The process comprises the steps of providing a rare earth metal and an iron-group transition metal as separate entities, mixing these metals without alloying, and hot-forming the mixture at a temperature lower than the eutectic point of the system of metallic components in the mixture, thereby forming an intermetallic compound at the interface between the rare earth metal and the transition metal while causing said metals to be bonded together.

The target material produced by this process contains 30-50 wt % of the rare earth metal, with the balance being made of the iron-group transition metal and incidental impurities. The structure of the target material is also characterized by the presence of an intermetallic compound phase at the interface between the particles of the rare earth metal and those of the transition metal. This composite target material has sufficiently high density, high strength, high deflective strength and good resistance to thermal shock to permit rotation and inversion during sputtering procedures without cracking. Furthermore, the oxygen content of this target material is no higher than 0.3 wt %. Therefore, a perpendicular magnetization film suitable for use in magnetooptical recording can be readily formed by sputtering the target material of the present invention. As a further advantage, the film deposition rate that can be achieved with this target material is significantly fast in comparison with the conventional alloy target material.

2 Claims, 6 Drawing Figures

COMPOSITE TARGET MATERIAL AND PROCESS FOR PRODUCING THE SAME

BACKGROUND OF THE INVENTION

The present invention relates to a composite target material used in the sputter-production of a thin film made of a rare earth metal and a transition metal (iron-group metal) that is attracting the increasing attention of researchers because of its potential for use as a magnetooptical recording material. The invention also relates to a process for producing such composite target material.

There exist three types of target material that are currently used in the sputter-production of thin films from combinations of rare earth metals and transition metals (iron-group metals). The first is an alloy target material with an oxygen content of 0.5–3.0 wt % that is produced by melting two dissimilar metals in an electric arc furnace either in vacuo or in an inert gas atmosphere (this type of composite target material consists of 30–50 wt % of a rare earth metal and 70–50 wt % of a transition metal). The second type is also an alloy target material but it is a composite comprising rare earth metal chips placed on a transition metal sheet or the combination of transition metal chips placed on a rare earth metal sheet. The third type is an alloy target material produced by a process patent previously applied for by the present inventors, this process consisting of preparing an alloy ingot by arc melting, dividing the ingot into fine particles and hot-pressing the resulting alloy powder into a compact.

The process for producing the first type of alloy target material has the following disadvantages:

(a) It is liable to segregation of trace elements during arc melting; the alloy product has residual cavities and casting defects; because of the brittleness of the alloy, it defies the use of forging, heat treatment and other processes conventionally used to provide homogeneity in the structure and composition of alloys, and this causes considerable difficulty in obtaining an ingot of a homogeneous composition, so that the resulting target material, and hence the film formed by sputtering said target, is liable to have an uneven composition;

(b) The size of the target material obtained depends on the size of the electric arc furnace used, and the brittleness of the material presents considerable difficulty in producing a product having an increased cross-sectional area; and (c) Arc melting alone is not sufficient to produce alloy target materials of desired shapes (especially thin-walled materials), and in order to obtain the desired shapes, subsequent working such as cutting or grinding is necessary, but then this greatly reduces the process efficiency.

The first type of alloy target material produced by the method described above has the following defects:

(d) Because of its low tenacity (deflective strength $\leq 2$ kg/mm$^2$), the target material will easily crack and is difficult to handle;

(e) It is highly likely to crack by thermal shock applied during sputtering procedures;

(f) The target material has a high oxygen content (0.5–3.0 wt %), so the thin film produced by sputtering this target material is not highly adapted to the formation of a perpendicular magnetization film for use in magnetooptical recording;

(g) The size of the target material depends on the size of the electric arc furnace used, and the maximum diameter that can be obtained with the state of the art today is 60 mm; and (h) The deposition rate obtained by sputtering this target material in a magnetron (Ar partial pressure: $1 \times 10^{-2}$ Torr, output: 0.5 A$\times$145 V, pre-sputtering time: 30 min., distance between slide glass substrate and target: 70 mm, bias voltage: 0 V, rotational speed of substrate: 10 rpm) is relatively slow (1,000–2,000 Å/min).

The process for producing the second type of composite target material has the following disadvantages:

(a) Abnormal discharge will easily take place between the sheet and chips; and (b) Non-uniformity in the distribution of rare earth metal chips and trace alloying elements on the transition metal sheet renders it difficult to obtain a film with a uniform composition.

The target material produced by this method has the following defects:

(c) It cannot be rotated or inverted and great difficulty is involved in using it while ensuring uniform distribution of the chips;

(d) Magnetic fluxes have a tendency to be concentrated in the bulk of the sheet rather than on its surface, and the chips on the sheet prevent the formation of a uniform magnetic field; and (e) As in the case of the first type of composite target material, the deposition rate obtained by magnetron sputtering (assuming sputtering conditions which are the same as those described in (h) above) is relatively slow (1,000–2,000 Å/min).

The third type of alloy target material and the process for producing it have the following defects:

(a) The target material is made of a powder of an intermetallic compound, and hence, is brittle; and (b) An oxide will easily form on the powder surface so as give a product having a higher oxygen content than the first and second types of target material, and therefore, if it is handled improperly during sputtering procedures, it will produce a thin film that is not suitable for use in a perpendicular magnetic recording.

SUMMARY OF THE INVENTION

One object, therefore, of the present invention is to provide a process for producing a target material that has a uniform internal composition, exhibits high density and strength, and contains small levels of oxygen.

Another object of the present invention is to provide a process that is capable of mass production of target materials having small thicknesses and large diameters.

A further object of the present invention is to provide a target material that has sufficiently high tenacity and great resistance to thermal impact to withstand the thermal shock that may occur during handling and sputtering procedures and to permit rotation and inversion and which has an oxygen content low enough to enable rapid formation by sputtering of a perpendicular magnetization film suitable for use in magnetooptical recording.

As the result of various studies made with a view to attaining these objects, the present inventors have made the following observations:

If a rare earth metal and a transition metal are used as physically separate starting materials instead of alloying them as in the third type of conventional composite target materials, and if a mixture of a transition metal with a rare earth metal which is in any one of the forms selected from among powder, small particles and chips is hot-formed at a temperature lower than the eutectic point of the mixture, a composite target material can be readily produced in high volumes without increasing the oxygen content, and surprisingly enough, the obtained target materials have a higher density and strength than the third type of conventional alloy target material because of plastic deformation and the solid-phase diffusion bonding between the rare earth metal and transition metal. It has also been found that this method facilitates mass production of target materials having a small thickness and a large diameter.

The present invention has been accomplished on the basis of these findings. It provides a process for producing a composite target material comprising the steps of preparing a mixture of at least one rare earth metal that is selected from the group consisting of Gd, Tb, Dy and alloys thereof and which is in the form of a powder, small particles, chips or combinations thereof, and a powder of at least one transition metal selected from the group consisting of Fe, Co and alloys thereof; hot-forming the mixture either in vacuo or in an inert gas atmosphere at a temperature lower than the eutectic point of the system of metallic components in the mixture, thereby forming an intermetallic compound at the interface between the rare earth metal and the transition metal while causing said metals to become bonded together.

DETAILED DESCRIPTION OF THE INVENTION

Details of the present invention are described below.

I. Starting Materials

The rare earth metals (Gd, Tb and Dy) and alloys thereof are in the form of a powder, small particles, chips or combinations thereof. The average size of these substances ranges from 10 $\mu$m to 5 mm, with the range of 10 $\mu$m–0.8 mm being selected for the powder and 0.8–5 mm for small particles and chips. If the average size of these substances is less than 10 $\mu$m, the resulting target material has an oxygen content higher than 0.5% and the film produced by sputtering this target material is not highly suitable for use as a perpendicular magnetization film in magnetooptical recording. If, on the other hand, the average size of the rare earth metals or alloys thereof exceeds 5 mm, the components in the target material are unevenly distributed and the thin film formed by sputtering this target will vary from one location to another. The most preferred average size is in the range of 0.1–3 mm.

The rare earth metals used as one starting material preferably have high purity ($\geqq 99\%$) and, especially, low oxygen content ($\leqq 0.4$ wt %).

The other starting material, or the powder of Fe, Co or alloys thereof, preferably has an average particle size of 1–200 $\mu$m. If the average size is less than 1 $\mu$m, the small particles must be pressed at sufficiently high pressures to provide an increased relative density. If the average size is more than 200 $\mu$m, the components in the target material are distributed so randomly as to provide a non-uniform composition. Furthermore, excessively large particles cannot be intimately mixed with the rare earth metals.

Like the rare earth metals, the transition metals preferably have high purity and, especially, low oxygen content ($\leqq 0.4$ wt %).

The proportions of the rare earth metals to be mixed with the transition metals are determined by such factors as the desired properties of the thin film to be obtained by sputtering the composite target material, and the preferred range is from 30 to 50 wt % for the rare earth metals and from 70 to 50 wt % for the transition metals.

If trace components are added, they are preferably alloyed with the rare earth metals or transition metals to make small particles of rare earth metal alloys and/or a powder of transition metal alloys with a view of preventing the internal composition of the composite target material from becoming non-uniform.

II. Hot-forming

Hot-forming processes include hot pressing, HIP, hot-forging and hot pack rolling, and any of these processes may be employed in the production of composite target materials. The hot-pressing technique is suitable for the purpose of producing a target material in a thin sheet form.

In order to produce a composite target material having a low oxygen content, the atmosphere for hot-pressing must be either vacuum or an inert gas atmosphere (e.g. argon gas with a dew point of $-60°$ C. or below). If vacuum is used, the preferred pressure ranges from 0.01 to $10^{-6}$ Torr.

The temperature used in hot-pressing must be lower than the eutectic point of the system of metallic components present in the mixture of rare earth metals and transition metals. If the mixture is hot-pressed at the eutectic point or higher, a liquid phase forms and the chance of oxidation of metals is increased to provide a target material having an oxygen content of 0.5% or more. As a further problem, the liquid phase comes out of the system under pressure to cause a potentially high incidence of trouble. The following eutectic points may be given as a guide: 840° C. for the Fe-Tb system, 695° C. for the Fe-Co-Tb system, 830° C. for the Fe-Tb-Gd system, and 630° C. for the Gd-Co system.

The hot-pressing process is preferably conducted at a pressure in the range of 100–200 kg/cm².

The hot-pressing process causes the plastic deformation of the respective metals in the mixture, partial solid phase diffusion between the rare earth metal and transition metal, and subsequent formation of an intermetallic compound at the interface between the two metals, as well as the joining thereof. As a result of these phenomena, higher densities and the joining of the rare earth metals such as those in the form of small particles and the transition metals which are in a powder form are achieved, thereby producing a target material of high strength.

The mixture of rare earth metals and transition metals may be held under hot-pressing conditions for a sufficient period to cause the above described phenomena, and this period (hereunder referred to as the retention time) which varies with the hot-pressing temperature and pressure should generally be at least 2 hours.

The composite target material to be produced by hot-pressing is preferably not thinner than 1 mm. If its thickness is smaller than 1 mm, a large-diameter target material is difficult to produce and the practical thickness that can be sputtered is substantially zero. A target material intended for use in magnetron sputtering is preferably not thicker than 3 mm in order to avoid decreases in the surface magnetic flux density, and hence, sputtering efficiency. In order to make a thin target material such as one suitable for use in magnetron sputtering, the average size of the small powder, particles, or chips of rare earth metals is preferably not larger than the desired thickness of the final target material.

If HIP, hot rolling or hot forging processes are used as hot-forming techniques, a mixture of rare earth metals and transition metals is prepared as in the hot-pressing process, and a preferred procedure is as follows: the mixture is packed into a can, typically made of stainless steel sheet, which is in the form of a disk, rectangular plate or any other shape similar to the final target, in vacuo at a pressure of, for example $1-5 \times 10^{-6}$ Torr, and the mixture within the can is subjected to HIP, hot rolling or hot forging.

The present inventors made various studies on the sintered composite target material that is produced by the process described above and which has such a structure that an intermetallic compound phase of rare earth metals and transition metals is present at the interface between the particles of a rare earth metal and those of a transition metal (such intermetallic compound phase of the rare earth metals and transition metals is hereunder simply referred to as the intermetallic compound phase). As a result, the inventors accomplished an invention comprising a novel target material that is capable of being sputtered to rapidly form a perpendicular magnetization film suitable for use in magnetooptical recording.

Therefore, the other aspect of the present invention relates to a sintered composite target material that consists of 30-50 wt % of at least one rare earth metal selected from the group consisting of Tb, Gd, Dy Ho, Tm, Er and alloys thereof, and the balance being composed of at least one transition metal selected from the group consisting of Fe, Co, Ni and alloys thereof, and incidental impurities, characterized in that said target material has such a structure that an intermetallic compound phase is present at the interface between the particles of a rare earth metal and those of a transition metal.

Details of the sintered composite target material in accordance with the second aspect of the present invention are given below.

(i) Components and Incidental Impurities

The sintered composite target material in accordance with the second aspect of the present invention consists of at least one rare earth metal, and the balance which is composed of at least one transition metal and incidental impurities.

The rare earth metal which is one component of the sintered composite target material of the present invention is at least one member selected from the group consisting of Tb, Gd, Dy, Ho, Tm, Er and alloys thereof. Alloys of rare earth metals are those which consist of the combinations of two or more metals selected from Tb, Gd, Dy, Ho, Tm and Er.

The transition metal which is the other component of the sintered composite target material of the present invention is at least one member selected from the group consisting of Fe, Co, Ni and alloys thereof. Alloys of transition metals are those which consist of the combinations of two or more metals selected from Fe, Co and Ni.

Examples of the incidental impurities include elements of Group IIIA in the periodic table, Si, Ca, Al, C, P, S, Ta, Mn and O.

(ii) Composition

The sintered composite target material of the present invention consists of 30-50 wt % of at least one of the rare earth metals or alloys thereof specified in (i), and the balance being the combination of at least one of the transition metals and alloys thereof with incidental impurities specified in (i).

When even the content of the rare earth metal or alloy thereof is less than 30 wt % or more than 50 wt %, the resulting composite target material cannot be sputtered to provide films having practically feasible magnetization properties because all magnetization produced is within, rather than perpendicular to, the film surface, and the coercive forces of the films are small. Therefore, in accordance with the present invention, the content of the rare earth metal or alloy thereof is limited to be within the range of 30-50 wt %.

From a practical viewpoint in the preparation of starting materials, it is inevitable that the sintered composite material of the present invention contains no more than 0.1 wt % of an incidental impurity selected from the elements of group IIIA in the periodic table, Si, Ca and Al, no more than 0.1 wt % of C, P or S, or no more than 0.3 wt % of Ta or Mn.

(iii) Oxygen Content

The amount of oxygen present as an incidental impurity in the sintered composite target of the present invention is no more than 0.3 wt %, which is much lower than the oxygen content in the conventional alloy target materials. Because of this oxygen content, the film formed by sputtering the sintered composite target material of the present invention displays the perpendicular magnetization properties necessary for use in magnetooptical recording.

(iv) Metallic Structure

Figure 3:
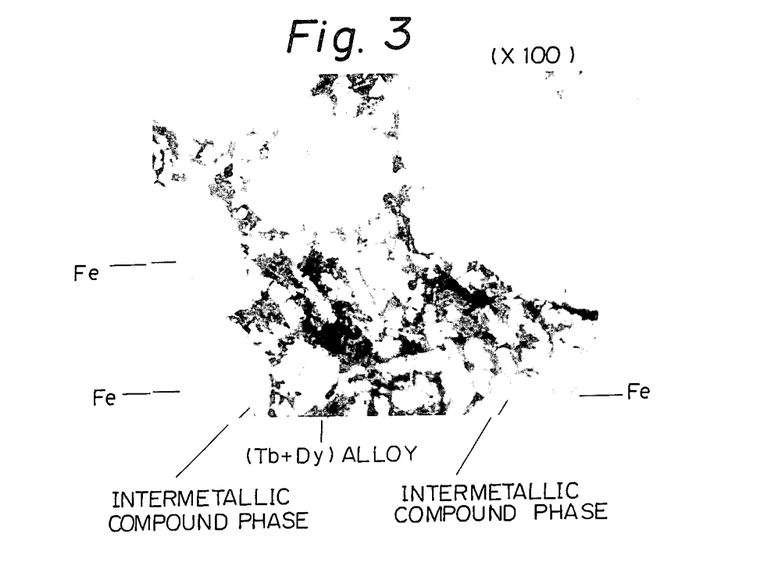
FIGS. 3 to 5 are micrographs showing the metallic structures of sintered composite target material in accordance with further embodiments of the present invention.

As shown in the micrograph of FIG. 3, the sintered composite target material of the present invention has a metallic structure wherein an intermetallic compound phase is present at the interface between particles of a rare earth metal and those of a transition metal. The intermetallic compound phase may form a layer as shown in FIG. 3; alternatively, it may occur as occasional (dispersed) islands. For the purpose of providing a strong bond between the rare earth and transition metals, the intermetallic compound phase is preferably in the form of a layer.

The content of the intermetallic compound phase in the composite target material is preferably in the range of 0.2-80 vol %, exclusive of the pores. If the content of the intermetallic compound phase is less than 0.2 vol %, the particles are bonded together so weakly that the composite target material is difficult to handle or work without being damaged. If the content of the intermetallic compound phase exceeds 80 vol %, the target material becomes so brittle that it will easily break during handling or microcracks that may eventually lead to failure will develop in the surface as a result of the thermal impact that occurs during sputtering procedures. More preferably, the content of the intermetallic compound phase lies within the range of 1–50 vol %.

The following examples are provided as further illustrations of the process for producing a target material in accordance with the present invention and the resulting target material.

EXAMPLE 1

Small particles (average size: 2 mm) of Tb with a purity of 99.95% ($O_2$ content: 0.03%) and an iron powder ($-100$ mesh) with a purity of 99.9% ($O_2$ content: 0.005%) were provided in metered amounts that would give a composition of 49 wt % Tb and 51 wt % Fe. The Tb particles and Fe powder were mixed in toluene for 30 minutes using a ball mill. The mixture was recovered from the ball mill and dried. A portion (200 g) of the dried mixture was charged into a hot-press mold (ID: 127 mm) and heated at a rate of 800° C./hr and a pressure of $1.0 \times 10^{-4}$ Torr or below. When the temperature in the mold reached 800° C., the charge was hot-pressed at 150 kg/cm² for a retention time of 1 hour. After completion of the hot-pressing, the compact was furnace-cooled. The recovered compact was polished on the surface to make a composite target material in a thin sheet form having a diameter of 127 mm and a thickness of 2.0 mm.

A microscopic observation of this composite target material revealed the presence of an intermetallic compound phase at part of the interface between Tb and Fe particles. The target material had a relative density of 96%, a deflective strength of 8 kg/mm² and an oxygen concentration of 0.12%.

The procedures described above were repeated except that the small Tb particles were replaced by those having a purity of 99.8% and an $O_2$ content of 0.06%. The results were substantially the same as described above.

EXAMPLE 2

Small particles (average size: 0.5 mm) of Tb with a purity of 99.95% ($O_2$ content: 0.03%) and a powder of Fe-8 wt % Co alloy ($-150$ mesh) with a purity of 99.9% ($O_2$ content: 0.005%) were provided in metered amounts that would give a composition of 48 wt % Tb, 48 wt % Fe and 4 wt % Co. These starting materials were mixed, dried, and hot-pressed as in Example 1 except that the weight of the charge in the mold was 110 g and the hot-pressing temperature was 600° C. The compact was recovered from the mold and polished to provide a composite target material in a thin sheet form having a diameter of 127 mm and a thickness of 1.0 mm.

This target material had an intermetallic compound phase at part of the interface between Tb and Fe-Co particles. The target material had a relative density of 97.5%, a deflective strength of 6 kg/mm² and an oxygen concentration of 0.18%.

The procedures described above were repeated except that the small Tb particles were replaced by those having a purity of 99.8% and an $O_2$ content of 0.06%. The results were substantially the same as described above.

EXAMPLE 3

Small particles (average size: 0.1 mm) of Tb-Gd alloy (59 wt % Tb—41 wt % Gd) with a purity of 99.95% ($O_2$ content: 0.03%) and an iron powder ($-150$ mesh) were provided in metered amounts that would give a composition consisting of 29 wt % Tb, 20 wt % Gd and 51 wt % Fe. The Tb-Gd particles and Fe powder were mixed in toluene for about 1 hour using a ball mill. The mixture was recovered from the ball mill and dried. A portion (110 g) of the dried mixture was charged into a hot-press mold (ID: 127 mm) and heated at a rate of 800° C./hr and a pressure of $1.0 \times 10^{-4}$ Torr or below. When the temperature in the mold reached 800° C., the charge was hot-pressed at 150 kg/cm² for a retention time of 3 hours. After completion of the hot-pressing, the compact was recovered and polished to provide a composite target material in a thin sheet form having a diameter of 127 mm and a thickness of 1.0 mm.

The greater part of the boundaries between the small particles of Tb-Gd alloy and Fe particles in this target material was composed of an intermetallic compound. The target material had a relative density of 96.9%, a deflective strength of 9 kg/mm² and an oxygen concentration of 0.28%.

COMPARATIVE EXAMPLE

A composite target material was produced as in Example 1 except that the charge in the hot-press mold was held at 850° C. higher than the eutectic point of the Tb-Fe system. This target material had a relative density of 99%, a deflective strength of 3 kg/mm² and an oxygen concentration of 2.0%. Furthermore, there occurred a leakage of molten metal from the mold.

EXAMPLE 4

Small particles (1 mm) of Gd with a purity of 99.9% ($O_2$ content: 0.04%) and a Co powder ($-100$ mesh) with a purity of 99.9% ($O_2$ content: 0.005%) were provided in metered amounts that would give a composition consisting of 47 wt % Gd and 53 wt % Co. These starting materials were subsequently worked as in Example 1 except that the hot-pressing temperature was 600° C.

The resulting composite target material had an intermetallic compound phase in part of the interface between Gd and Co particles. This target material had a relative density of 97.0% and an oxygen concentration of 0.18%.

EXAMPLE 5

A mixed powder (300 g) which was of the same composition as used in Example 1 was charged into a disk-shaped can that was formed of a stainless steel plate (1 mm thick) and which had an inside diameter of 130 mm and a depth of 5 mm (i.e., OD: 132 mm, thickness: 7 mm). Charging was performed through a vacuum drawing pipe attached to the can. The can was then evacuated to a pressure of $3 \times 10^{-6}$ Torr and sealed. The can was HIP-treated under the following conditions: temperature elevation rate, 800° C./hr, temperature, 800° C., pressure applied, 2,000 atm., and retention time, 2 hours. After cooling, the can was removed by machining thereby providing a composite target material.

This target material had a relative density of 100%, a deflective strength of 10.5 kg/mm² and an oxygen concentration of 0.10%.

EXAMPLE 6

A composite target material was produced as in Example 5 except that instead of performing HIP, a stainless steel can containing a mixed powder was hot-forged with a 200-t forging machine at 600° C. until the thickness of the can was reduced to 5 mm, followed by heat treatment for the formation of an intermetallic compound under the following conditions: temperature elevation rate, 700° C./hr, temperature, 78° C., and retention time, 3 hours.

The resulting composite target material had a relative density of 99%, a deflective strength of 7.8 kg/mm$^2$ and an oxygen concentration of 0.10%.

EXAMPLE 7

A composite target material was produced as in Example 6 except that instead of hot-forging, the stainless steel can containing a mixed powder was hot-rolled until the thickness of the can was reduced to 4 mm.

The resulting composite target material had a relative density of 100%, a deflective strength of 11.2 kg/mm$^2$ and an oxygen concentration of 0.10%.

EXAMPLE 8

Figure 1A:
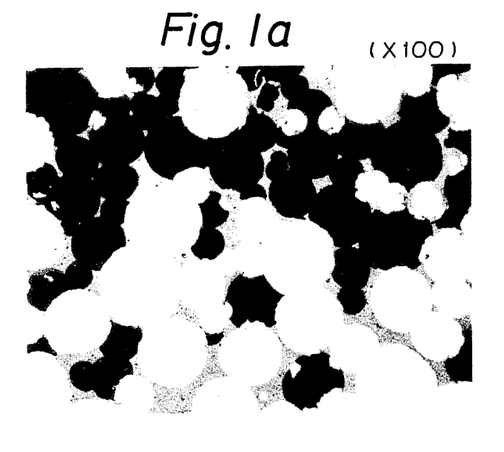
FIG. 1(a) is a micrograph showing the metallic structure of the sintered composite target material in accordance with one embodiment of the present invention.
Figure 1B:
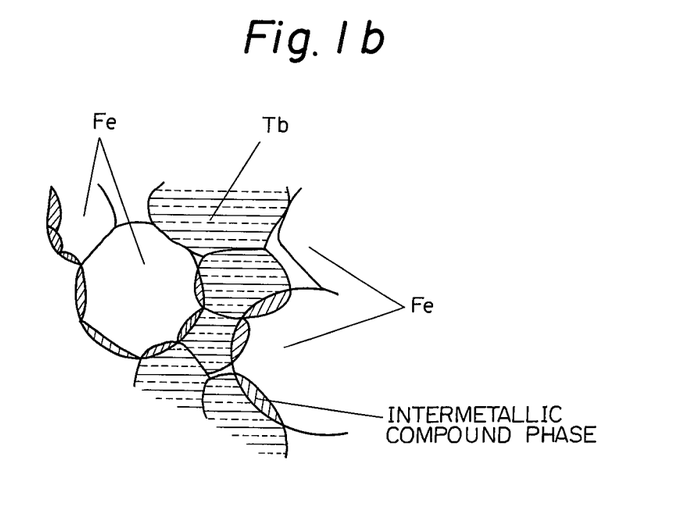
FIG. 1(b) is a partial enlarged sketch showing schematically the structure in FIG. 1(a)

A Tb powder (average particle size: 100 μm) with a purity of 99.9% and an iron powder (purity: 99.99%) were provided in metered amounts that would give a composition consisting of 49 wt % Tb and 51 wt % Fe. The respective powders were mixed in toluene for 30 minutes using a ball mill, recovered from the ball mill and dried. A portion (160 g) of the dried mixture was packed into a hot-press mold (ID: 127 mm) which was heated at a rate of 800° C./hr and a pressure of $10^{-3}$ Torr. When the temperature in the mold reached 800° C. the charge was hot-pressed at a pressure of 400 kg/cm$^2$ for a retention time of 15 minutes. After completion of hot-pressing, the compact was furnace-cooled. The recovered compact was polished on the surface to provide a sintered composite target material. The composition of this target material was substantially the same as that of the starting mixture. The target material had the structure shown in FIG. 1(a) and (b), wherein a layer of an intermetallic compound such as Tb$_2$Fe having an average thickness of 1 μm was present at the interface between Tb and Fe particles. The respective proportions of the three phases, i.e., Tb particles, Fe particles and intermetallic compound, were 44 vol %, 48 vol % and 8 vol %. The target material had a diameter of 127 mm and a thickness of 1.5 mm. It had an oxygen content of 0.1 wt %. An XMA line analysis was employed to confirm that the phase present at the interface between Tb and Fe particles was composed of an intermetallic compound of the two elements. The composite target material had a deflective strength of 13 kg/mm$^2$ and a satisfactorily high resistance to thermal impact.

The deposition rate attained by magnetron-sputtering this composite target material was 5,000 Å/min (for the sputtering conditions, see those specified in (h) in connection with the first type of conventional alloy target materials).

EXAMPLE 9

An iron powder (purity: 99.99%), Co powder (purity: 99.99%), Tb powder (purity: 99.9%) and Gd powder (purity: 99.9%), each having an average particle size of 20 μm, were provided in metered amounts that would give a composition consisting of 39.4 wt % Fe, 36.4 wt % Co, 12.5 wt % Tb and 11.7 wt % Gd. This formulation was worked as in Example 8 except that a hot-press mold having an inside diameter of 203 mm was charged with 770 g of the formulation and heated at 600° C. A sintered composite target material had a structure which was substantially the same as that of the initial formulation and had a layer of an intermetallic compound phase (thickness: 1–5 μm) at the interface between Tb/Gd and Fe/Co particles. The respective proportions of the five phases, i.e., Tb particles, Gd particles, Fe particles, Co particles and intermetallic compound, were 23 vol %, 12 vol %, 32 vol %, 28 vol % and 5 vol %. The target material had a diameter of 203 mm and a thickness of 3 mm. It had an oxygen content of 0.2 wt %. It had a deflective strength of 12 kg/mm$^2$ and a satisfactorily high resistance to thermal impact. The deposition rate attained by magnetron-sputtering the target material under the same conditions as in Example 8 was 6,200 Å/min.

EXAMPLE 10

Figure 2:
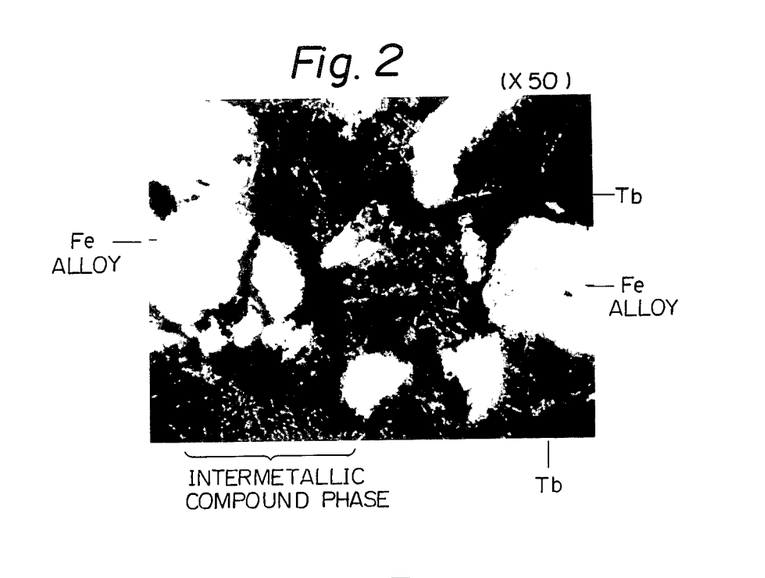
FIG. 2 is a micrograph showing the metallic structure of the sintered composite target material in accordance with another embodiment of the present invention.

Chips (average dimension: 0.2 mm × 0.05 mm × 2 mm) of Tb (purity: 99.9%) and chips of Fe—5 wt % Co were provided in metered amounts that would give a composition consisting of 49 wt % Tb and 51 wt % Fe. These chips were worked as in Example 8 except that the hot-press mold was charged with 170 g of a mixture of the chips and heated at 600° C. The resulting sintered composite target material had a composition which was substantially the same as that of the initial formulation. It had the structure shown in FIG. 2, wherein an intermetallic compound phase was present at the interface between Tb and Fe-Co chips. The respective proportions of the three phases, i.e., Tb chips, Fe-Co chips and intermetallic compound, were 21 vol %, 55 vol % and 24 vol %. The composite target material had a diameter of 127 mm and a thickness of 2 mm. Its oxygen content was 0.01 wt %. The target material had a deflective strength of 17 kg/mm$^2$ and a satisfactorily good resistance to thermal shock. This target material was magnetron-sputtered as in Example 8 and a deposition rate of 4,700 Å/min was attained.

EXAMPLE 11

Particles (average size: 100 μm) of Co (purity: 99.99%) were plated with an iron layer having an average thickness of 1 μm. The resulting powder had a composition of 97 wt % Co and 3 wt % Fe.

A Tb—20 wt % Ho alloy powder having an average particle size of 100 μm was blended with the Fe-plated powder to give a composition consisting of 58.4 wt % Fe-plated powder and 41.6 wt % Tb alloy. The blend was worked as in Example 8 except that the hot-press mold was charged with 310 g of the blend and heated at 600° C. The resulting sintered composite target material had a composition which was substantially the same as that of the initial formulation. It had such a structure that an intermetallic compound phase was present at the interface between the Fe plating and Tb alloy particles and the respective proportions of the four phases, i.e., Tb alloy particles, Fe plating, Co particles and intermetallic compound, were 44 vol %, 2.8 vol %, 53 vol % and 0.2 vol %. The composite target material had a diameter of 127 mm and a thickness of 3 mm. Its oxygen content was 0.18 wt %. The target material had a deflective strength of 9 kg/mm$^2$ and a satisfactorily good resistance to thermal shock. When it was magnetron-sputtered as in Example 8, a deposition rate of 4,500 Å/min was attained.

EXAMPLE 12

A Tb—5 wt % Tm alloy powder (average particle size: 10 μm), a Dy—5 wt % Ho alloy powder (average particle size: 10 μm) and iron shot (average pellet size: 200 m, purity: 99.99%) were provided in metered amounts that would give a composition consisting of 20 wt % Tb alloy, 23 wt % Dy alloy and 57 wt % Fe shot. These powders and shot were worked as in Example 8 except that a hot-press mold having an inside diameter of 203 mm was charged with 750 g of the powder mixture and heated at 600° C. The composition of the resulting sintered composite target material having diameter of 203 mm and a thickness of 4 mm was substantially the same as that of the initial formulation. The target material had the structure shown in FIG. 3, wherein an intermetallic compound phase was present at the interface between Tb-Dy particles and Fe pellets. The respective proportions of the four phases, i.e., Tb alloy particles, Dy alloy particles, Fe pellets and intermetallic compound, were 17 vol %, 17 vol %, 17 vol % and 49 vol %. This target material had an oxygen content of 0.24 wt %. It had a deflective strength was 10 kg/mm$^2$ and a satisfactorily good resistance to thermal shock. When the target material was magnetron-sputtered as in Example 8, a deposition rate of 5,800 Å/min was obtained.

EXAMPLE 13

The following three powders, each having an average particle size of 100 μm, i.e., Tb powder (purity: 99.9%), Fe-Co alloy powder (25 at. % Co) and Fe powder (purity: 99.99%), were provided in metered amounts that would give a composition consisting of 48.5 wt % Tb, 27.64 wt % Fe-Co alloy and 23.86 wt % Fe. The powders were dry-mixed for 20 minutes in an argon gas atmosphere, and 270 g of the resulting mixture was charged into a can that was formed of a stainless steel plate (1.2 mm thick), had a vacuum drawing pipe, and which had an inside diameter of 125 mm and a depth of 4 mm (i.e., OD: 127.4 mm, thickness: 6.4 mm). The can was sealed by evacuation at $1 \times 10^{-6}$ Torr and hot-rolled to a thickness of 4 mm at a temperature of 600° C. The rolled can was heated at 680° C. for a retention time of 10 hours. After cooling, the can was removed by machining, so as to provide a sintered composite target material.

Figure 4:
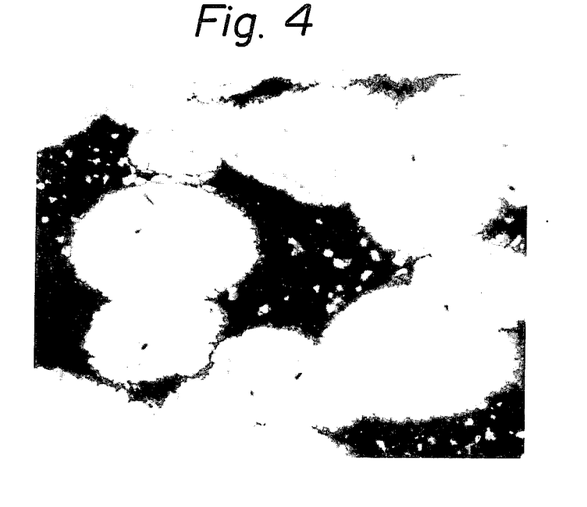

A microscopic observation (200 X) of the composite target material revealed that it had the structure shown in FIG. 4, from which one can see the formation of an intermetallic compound phase at the interface between Tb particles (black areas) and Fe or Fe-Co alloy particles (white areas).

The composite target material had a deflective strength of 13 kg/mm$^2$. When it was magnetron-sputtered as in Example 8, a deposition rate of 4,800 Å/min was obtained.

EXAMPLE 14

Two powders each having an average particle size of 80 μm, i.e., Tb powder (purity: 99.9%) and Fe powder (99.99%), were provided in metered amounts that would give a composition consisting of 48.68 wt % Tb and 51.32 wt % Fe. The two powders were worked as in Example 13 except that hot-rolling was replaced by hot-forging conducted at 700° C. with a 200-t forging machine and that the subsequent heat treatment was conducted at 780° C. (temperature elevation rate: 700° C./hr) for a retention time of 4 hours.

Figure 5:
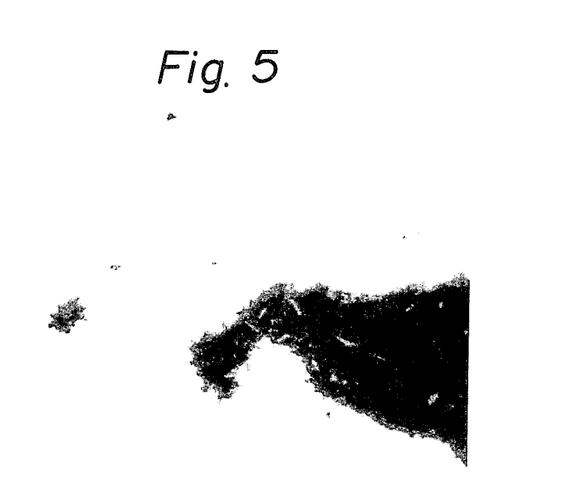

The metallic structure of the resulting sintered composite target material as observed under a microscope (200 X) is shown in FIG. 5, from which one can clearly see the presence of an intermetallic compound phase at the interface between Tb and Fe particles. This composite target material had a deflective strength of 8 kg/mm$^2$ and exhibited a deposition rate of 5,200 Å/min in magnetron-sputtering conducted as in Example 8.

EXAMPLE 15

Sintered composite target materials ( diameter: 127 mm, thickness: 5 mm) were produced by repeating the procedures of Example 8 except that the initial formulations were those indicated in Table 1 below. The resulting composite target materials had compositions which were substantially the same as those of the initial formulations. They had the oxygen contents indicated in Table 1. Their structures were the same in that intermetallic compounds (for their amounts, see Table 1) were present at the interface between the particles of rare earth metals and those of transition metals.

The deflective strengths of the composite target materials and the deposition rates achieved by magnetron-sputtering them as in Example 8 are also listed in Table 1.

TABLE 1

| | Composition (wt %) | | Sintered composite target material | | | |
|---|---|---|---|---|---|---|
| Sample No. | rear earch metals | transition metals | O$_2$ content (wt %) | content of intermetallic compound phase | Deflective strength (kg/mm$^2$) | Deposition rate (Å/min) |
| 1 | Tb - 10% Dy alloy: 42% | Fe - 8% Ni alloy: bal. | 0.1 | 8 | 12 | 6700 |
| 2 | Gd: 38% | Co: bal. | 0.13 | 6 | 9 | 5300 |
| 3 | Dy: 42% | Co: bal. | 0.20 | 18 | 11 | 5900 |
| 4 | Ho: 42% | Ni: bal. | 0.08 | 15 | 15 | 4300 |
| 5 | Tm: 47% | Co: bal. | 0.15 | 3 | 7.8 | 6600 |
| 6 | Er: 49% | Fe: bal. | 0.20 | 28 | 12 | 5000 |
| 7 | Gd: 21% Dy: 21% | Fe: 27% Ni: 31% | 0.10 | 35 | 15 | 4800 |
| 8 | Tb: 13% Gd: 14% Dy: 15% | Fe: bal. | 0.19 | 48 | 10 | 6000 |
| 9 | Gd - 10% Tb | Co - 8% Fe | 0.05 | 1 | 7 | 5700 |

TABLE 1-continued

| Sample No. | Composition (wt %) | | Sintered composite target material | | Deflective strength (kg/mm²) | Deposition rate (Å/min) |
|---|---|---|---|---|---|---|
| | rear earch metals | transition metals | O₂ content (wt %) | content of intermetallic compound phase | | |
| 10 | alloy 42% Gd: 30% Tb - 3% Er alloy: 7% | alloy: bal. Fe: bal. | 0.12 | 13 | 8.5 | 4400 |

The advantages of the process for producing a composite target material in accordance with the present invention and the resulting target material are summarized below:

(1) The conventional alloy target materials produced by hot-pressing prealloyed powders of rare earth metals and transition metals have relative densities in the range of 88-92%. In comparison, the process of the present invention is capable of producing a composite target material having a high relative density in the range of 96-100%. Such high relative densities can be attained without employing high temperatures in the range of 1,000°-1,100° C. but temperatures (e.g. 600° or 800° C.) lower than the eutectic points of the systems of metal components in the target material are sufficient to attain the desired high densities.

(2) The prior art alloy target materials have oxygen concentrations not lower than 0.5 wt %, but the composite target material of the present invention shows low oxygen levels between 0.1 and 0.3 wt %.

(3) The composite target material of the present invention has a high density as described in (1), and, in addition, the rare earth and transition metals are partly bonded by an intermetallic compound phase. Therefore, the target material has a sufficient strength that enables the provision of a small thickness and a large diameter.

(4) As shown in Examples 8 to 14 and in Table 1, the sintered composite target material in accordance with the present invention has a high tenacity with a deflective strength ranging from about 7 to 20 kg/mm². This tenacity, combined with good resistance to thermal shock, provides the target material with a sufficient strength to withstand handling procedures and thermal shock during sputtering operations without cracking. The target materials, which is of the one-piece structure and has high tenacity, permits rotation and inversion during sputtering operations. Its oxygen content is no higher than 0.3 wt %. Therefore, a perpendicular magnetization film suitable for use in magnetooptical recording can be readily obtained by sputtering this composite target material. The deposition rate that can be achieved during sputtering operations ranges from 4,000 to 7,000 Å/min, which is twice to seven times as fast as the rates attained by the conventional composite materials. In other words, by sputtering the target material of the present invention, a film of the desired thickness can be formed within a period that is from one half to one-seventh of the conventionally required duration. One serious problem with the sputtering techniques is its low film deposition rate, but this is satisfactorily solved by using the sintered composite target material of the present invention.

What is claimed is:

1. A process for producing a composite target material comprising the steps of preparing a mixture of at least one rare earth metal that is selected from the group consisting of Gd, Tb, Dy and alloys thereof and which is in the form of a powder, small particles, chips or combinations thereof, and a powder, of at least one transition metal selected from the group consisting of Fe, Co and alloys thereof; hot-forming the mixture either in vacuo or in an inert gas atmosphere at a temperature lower than the eutectic point of the system of metallic components in the mixture, thereby forming an intermetallic compound at the interface between the rare earth metal and the transition metal while causing said metals to be bonded together.

2. In a sintered composite target material that consists of 30-50 wt % of at least one rare earth metal selected from the group consisting of Tb, Gd, Dy, Ho, Tm, Er and alloys thereof, and the balance being composed of at least one transition metal selected from the group consisting of Fe, Co, Ni and alloys thereof, and incidental impurities, the improvement wherein said target material has such a structure that an intermetallic compound phase is present at the interface between the particles of a rare earth metal and those of a transition metal.

* * * * *